June 25, 1929.   C. A. FAUSEL ET AL   1,718,340
TAXIMETER
Filed Sept. 24, 1923   5 Sheets-Sheet 1

INVENTORS
Charles A. Fausel
Harry E. Bauer
BY Schechter & Lotsch
their ATTORNEYS June 25, 1929.  C. A. FAUSEL ET AL  1,718,340
TAXIMETER
Filed Sept. 24, 1923   5 Sheets-Sheet 2
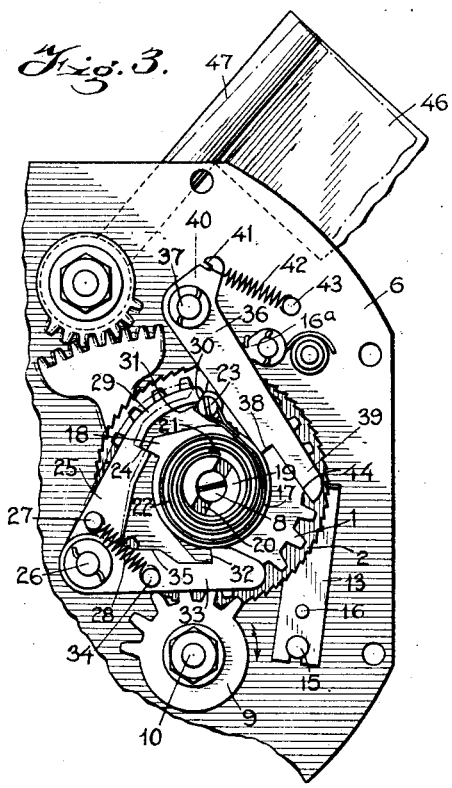
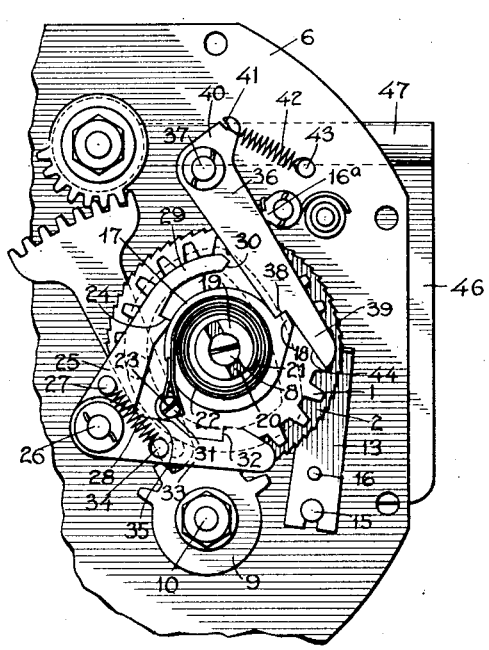
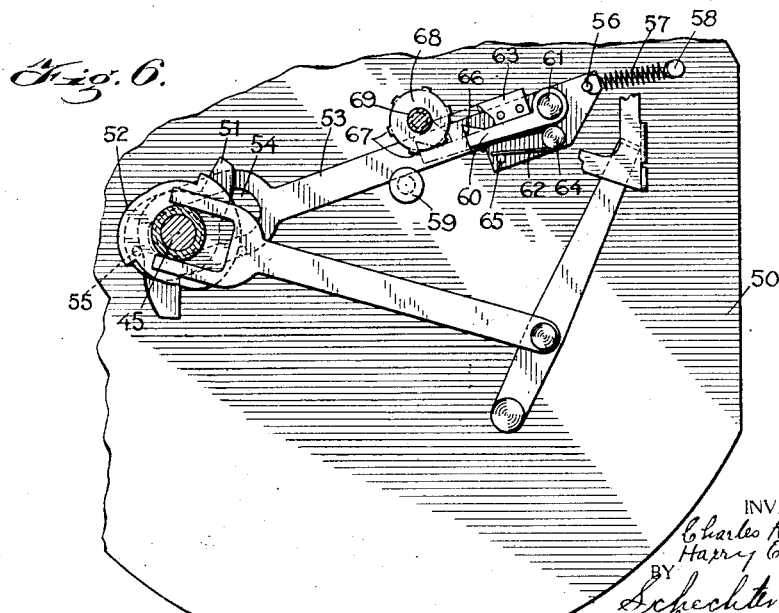

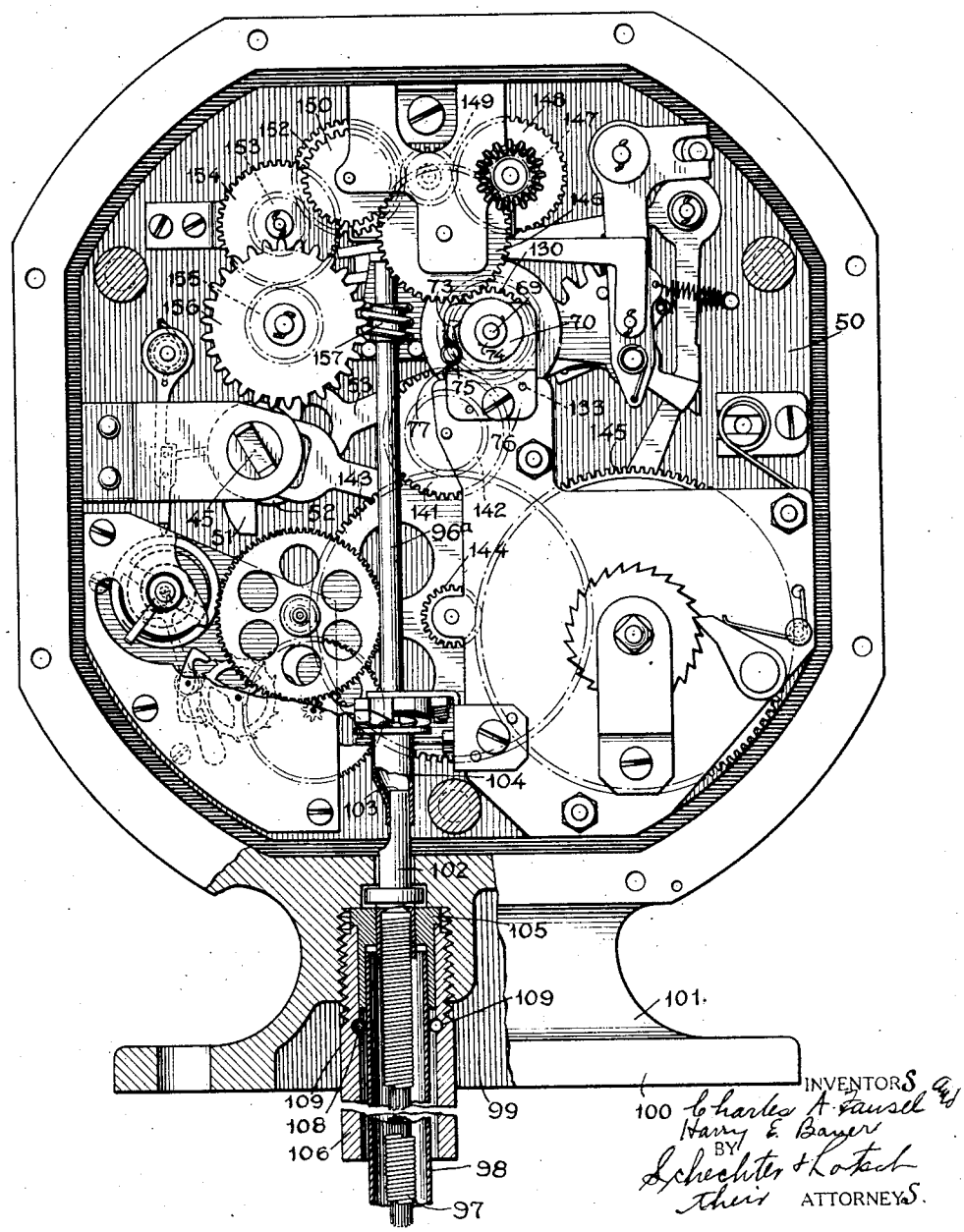

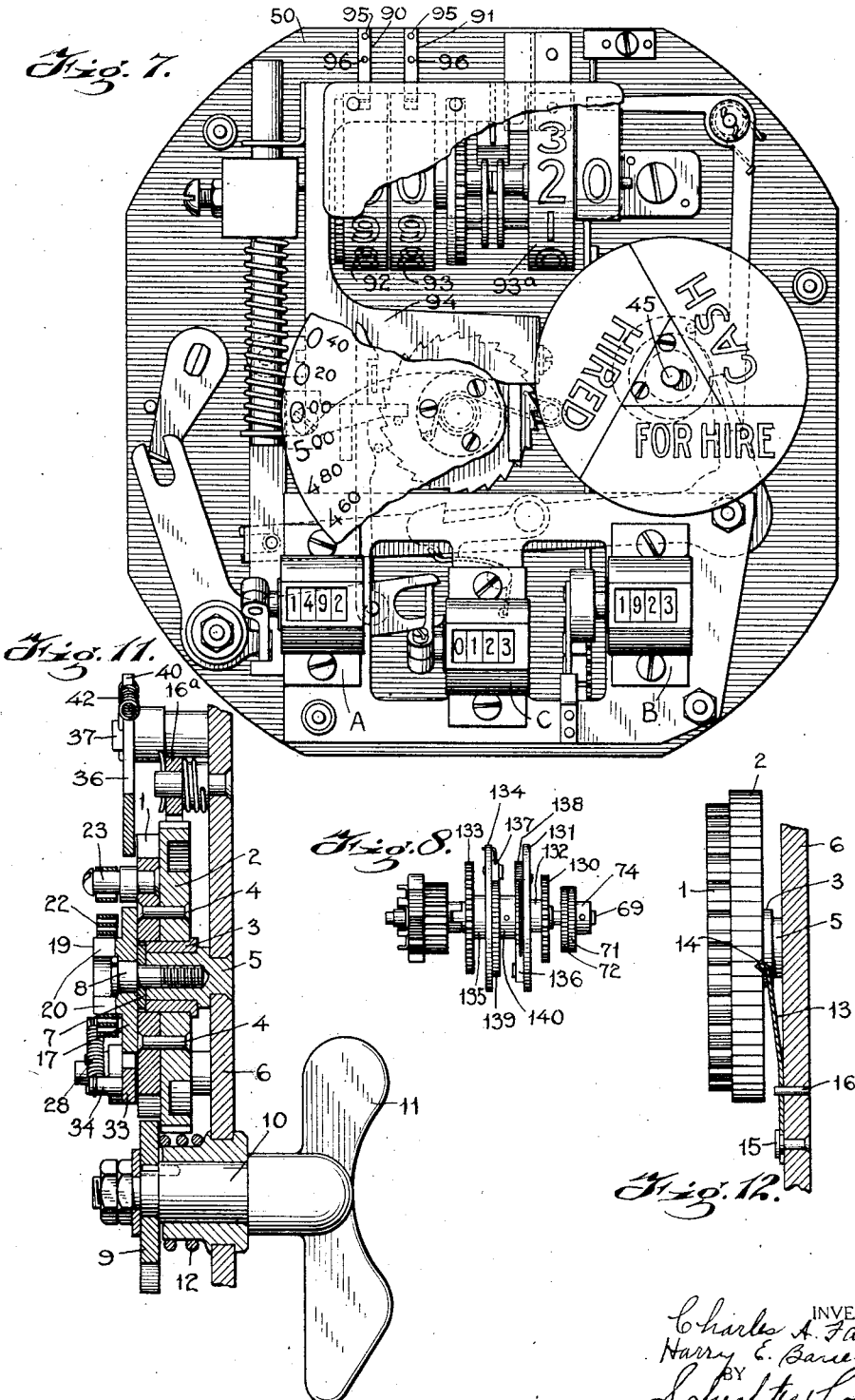

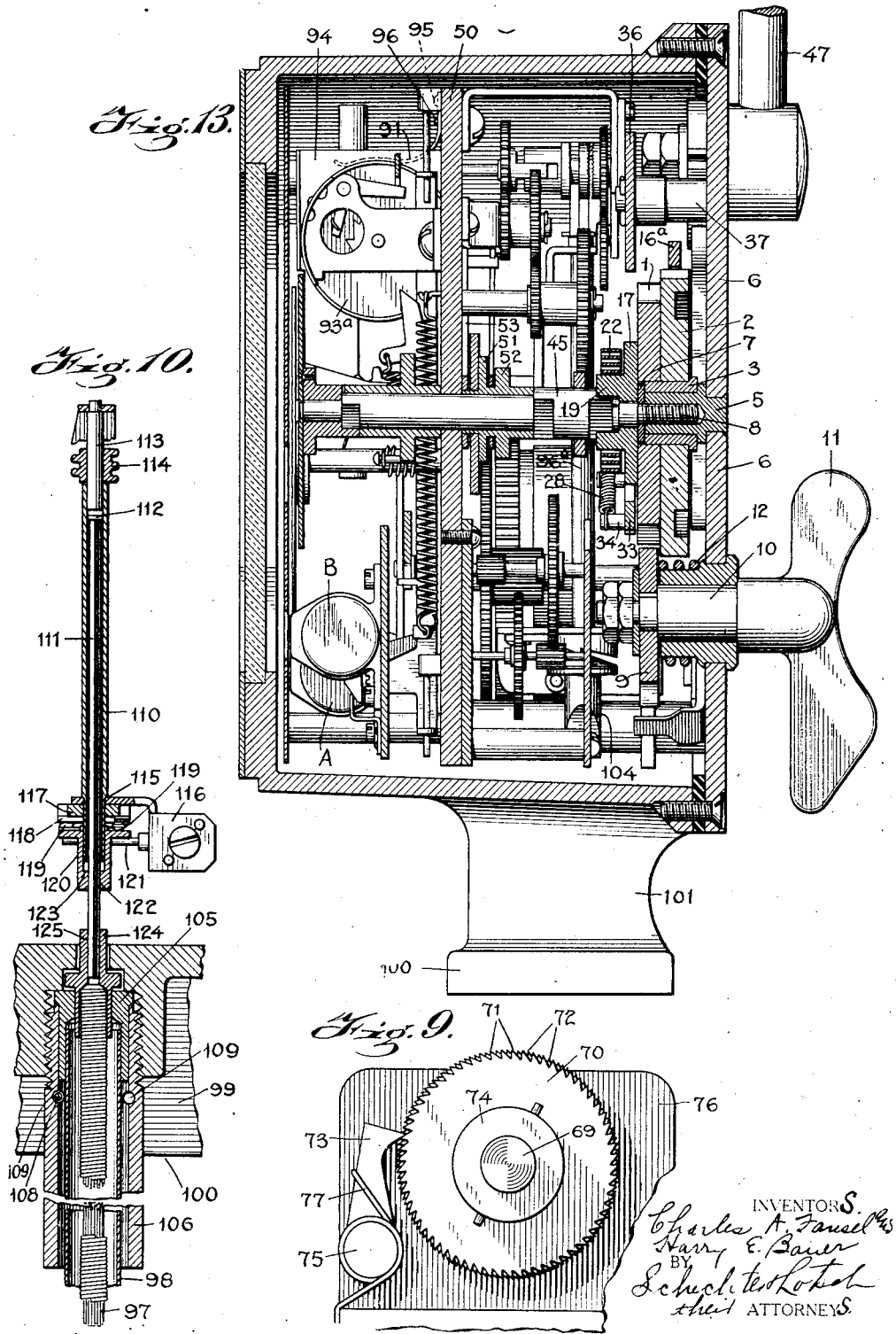

Patented June 25, 1929.

1,718,340

UNITED STATES PATENT OFFICE.

CHARLES A. FAUSEL, OF GLEN RIDGE, NEW JERSEY, AND HARRY E. BAUER, OF NEW YORK, N. Y., ASSIGNORS TO INTERNATIONAL TAXAMETER CORPORATION, A CORPORATION OF NEW YORK.

TAXIMETER.

Application filed September 24, 1923. Serial No. 664,361.

Our invention relates to automatic fare registers, commonly called "taximeters" used upon public conveyances such as cabs and the like, and which indicate automatically the fare due and register other information such as pay and dead mileage and totals of earned fares to provide a basis for settlement of accounts between the driver and proprietor of the conveyance.

The class of fare indicators to which our invention is adapted is disclosed in the patents to Alonzo G. Decker No. 1,058,222 dated April 8, 1913 and No. 1,013,279 dated January 2, 1912, and we have here described only such parts of the mechanism of such registers as is essential to a proper understanding of our invention.

Fare registers of the class described are customarily provided with a lever to control the actuation of certain of the registering devices, this lever commonly being provided with a "flag" the position of which is intended to indicate whether the particular registering mechanism connected by the lever is operative or not and as the operation of this mechanism is intended to correspond to whether the vehicle is "hired" or "vacant" the "flag" in one position, usually vertical is intended to indicate a vacant conveyance and in another position usually horizontal is intended to indicate a hired vehicle.

As the basis of settlement between the proprietor and the driver is largely the registrations of "hired" mileage or time, a dishonest driver will sometimes attempt to prevent registration of true hired mileage or time by carrying a pay passenger with the registering mechanism inoperative. Doing this with the flag in "vacant" position however makes detection probable, as the position of the flag indicates to the passenger and traffic officers that the register is not indicating the hired mileage or time. In many cities there are ordinances specifically requiring the driver to place the flag in hired indicating position when carrying a passenger.

To avoid detection dishonest drivers "notch the meter" which is lowering the flag far enough to suggest to the casual observer that the flag is in lowered or "hired" position while as a matter of fact the flag has not been lowered a sufficient degree to connect the registering mechanism controlled by the flag.

By careful manipulation and observation an unscrupulous driver can learn the point in the position of the flag at which the registering mechanism becomes operative and with a little practice can lower the flag just short of this position.

An object of our invention is to provide mechanism which will give no indication of the exact point in the movement of the flag at which the registering mechanism becomes operative.

Another object of our invention is to provide means, automatic in operation, at a predetermined point to take the control of the taximeter out of the hands of the driver and to prevent him from tampering with the legitimate operation of the taximeter.

Another object of our invention is the construction of a device in which the totalizers cannot be tampered or interfered with and will therefore at all proper times have all the totalizers registering and indicating the true condition of operation.

Another object of our invention is the provision of means for holding the fare indicating devices or wheels in proper position when the restoring slide is out of engagement.

Another object of our invention is the provision of means in the form of an association of mechanism which takes up lost motion in the gearing mechanism and renders more accurately the proper operation of the device.

A further object of our invention is the construction of efficient and simple connecting means between the shaft of the indicator and the driving shaft of the vehicle.

With these and other objects in view to be more fully set forth hereinafter, the invention consists in the novel construction, combination of elements, and arrangement of parts for a fare indicating device by means which will be exemplified in the operation and construction herein described in the following specification and illustrated in the accompanying drawings, considered together or separately.

In the drawings,—

Fig. 3 is a detail view of a portion of the control mechanism in advance of its operating position.

Fig. 4 is a detail view of a portion of the control mechanism showing the same in "Cash" position.

Fig. 5 is a detail view, partly in section of the casing with the back plate removed, showing certain portions of the operating mechanism and its connections with the driving shaft.

Fig. 6 is a detail view of a portion of differential shaft resetting mechanism.

Fig. 7 is a detail front view of a portion of the machine with the dial removed.

Fig. 8 is a detail view of the differential shaft with a portion of the "back lash" mechanism.

Fig. 9 is a detail fragmentary view of the "back lash" mechanism.

Fig. 10 is a detail sectional view of a modified form of driving shaft connection.

Fig. 11 is a sectional view on the line 11—11 of Fig. 1.

Fig. 12 is a sectional view on the line 12—12 of Fig. 1.

Fig. 13 is an elevation of the right end of the assembled machine, partly in section to show the cam shaft connection.

Figure 1:
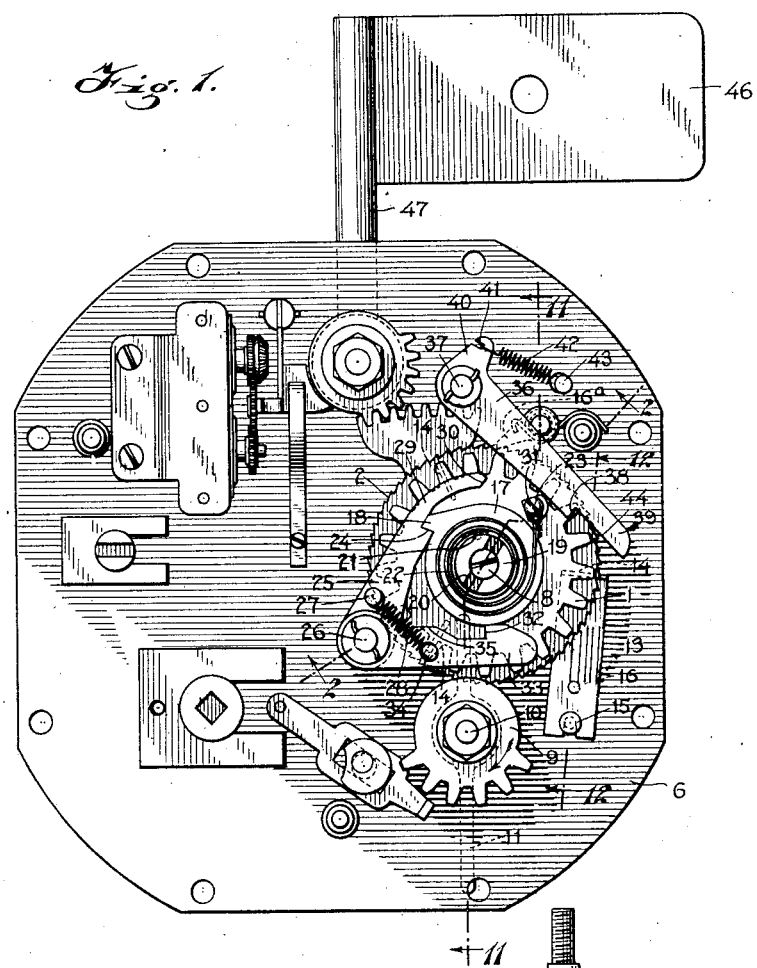
Fig. 1 is an interior view of the back plate illustrating our invention applied thereto.
Figure 2:
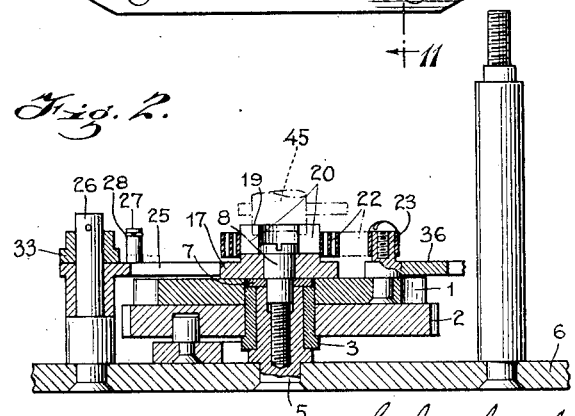
Fig. 2 is a sectional view on line 2—2 of Fig. 1.

In the drawing, the gear 1 and the cam and ratchet wheel 2 (Figs. 1 and 11) are pressed on the bushing 3 and are held in position relative to each other by rivets 4. The gear, cam and ratchet combination 1 and 2 rotates freely on the stud 5 which is fixed in the back plate 6 and is prevented from axial movement on stud 5 by washer 7 which is fixed to stud 5 by screw stud 8.

A mutilated gear 9 is mounted on the back plate 6 and is affixed to the shaft 10 of the handle 11. The motion of the mutilated gear 9 is retarded by the friction spring 12 which is wound around the shaft 10 (Fig. 11). The teeth of the mutilated gear 9 mesh with the teeth of the gear 1 and the ratio is so proportioned that one revolution of mutilated gear 9 imparts one-third of a revolution to gear 1. The gear, cam and ratchet combination 1 and 2 is held in position by the spring brake 13 (Figs. 1 and 12) which engages with the notches 14 on the cam and ratchet 2, thus preventing accidental rotation of the cam and ratchet combination 1 and 2 when the mutilated gear is not in engagement with it. The spring brake 13 is fixed to the back plate 6 by the stud 15 and the pin 16. The pawl 16ª prevent clockwise movement of the gear and ratchet wheel combination 1 and 2.

Rotatably mounted on screw stud 8 (Figs. 1 and 11) is an escapement wheel 17 on the periphery of which is formed a tooth 18. The wheel 17 has a hub 19 provided with a slot 20. Fixed on the hub 19 is a pin 21 which secures one end of a spiral spring 22 to the hub 19. The other end of the spiral spring 22 is held by a pin 23 which is fixed to the gear 1. The slot 20 engages with a correspondingly formed projection on the cam shaft 45 of the machine, Fig. 13, thus causing the cam shaft to rotate with it, as will be hereinafter described.

As shown, the mechanism in Figs. 1, 5, 7 and 13 is in what is known as the "for hire" position. There are two other positions, namely, the "hired" and the "cash" or temporary non-recording positions. These will be later described. When the mechanism is in the "for hire" position, the tooth 18 of the escapement wheel 17 is in engagement with a notch 24 formed in the lever 25 rotatably mounted on a stud 26 secured in the back plate 6. The lever 25 has affixed thereto a pin 27 to which is fastened a spring 28 thus holding the lever 25 under tension against the periphery of the escapement wheel 17. Formed on the lever 25 is an arm 29 having an inclined face 30. The said face 30 is in the path of the pin 23, upon which is formed a face 31. Thus it may be seen as the handle 11 (Figs. 1, 3, 11, 13) is turned so as to turn gear 9 in a clockwise direction, the mutilated gear 9 will rotate the gear 1 in a counter-clockwise direction. The pin 23 will be carried by the gear 1 and its face 31 will strike the face 30 of the lever 25, causing said lever to swing to the left. As the lever 25 continues to move to the left, its notch 24 will be forced from under the tooth 18 of the escapement wheel 17, causing the escapement wheel 17 to rotate in a counter-clockwise direction under impulsion of the spiral spring 22. The escapement wheel 17 will carry with it the cam shaft 45 of the machine by means of the rotation of the hub 19 to which one end of the spring 22 is secured and will continue to rotate in a counter-clockwise direction until its tooth 18 strikes the notch 32 of the lever 33 in which position it will stop. This position is known as the "hired" position. When the tooth 18 is released or moved from the notch 24, and the escapement wheel is then moved anti-clockwise, the control of the entire registering and recording mechanism is now out of the hands of the driver and it will automatically be set in its registering and recording position. As the gear, cam and ratchet combination 1 and 2 moves only one third of a revolution to every revolution of the mutilated gear 9, it will be seen that the pin 23 on the gear 1 will come to a stop before it can strike the lever 33, allowing the escapement wheel 17 to remain in the "hired" position until further movement of pin 23 occurs.

The actuation of the lever 25 by the pin 23 is so timed that it will release the escapement wheel 17 at a predetermined position. This position is determined by what is known as the "flag" 46 of the taximeter. When the taximeter mechanism is in the "for hire" position, Fig. 1, this "flag" 46 stands vertically with the staff 47 and when the mechanism is operated by turning handle 11 to indicate the "hired" position, the "flag" 46 (and its staff 47) are swung in an arc and lowered to a horizontal position, as indicated in Fig. 4. This position of the flag is the means by which the proper parties are informed as to whether the conveyance on which the taximeter is attached is "for hire" or "hired".

In the taximeter utilizing our invention, the driver, when his conveyance is hired, turns the handle 11 (Figs. 1, 11, 13) and starts to lower the "flag" and staff to the horizontal or "hired" position. He also turns the gear 1 but the cam shaft 45 will not turn as the escapement wheel 17 and the hub 19 remain stationary. However, when the gear 1 has been turned to a position where the "flag" is midway or at a predetermined position between the horizontal and vertical position (see Fig. 3), the face 31 of the pin 23 lifts the notch 24 of the lever 25 from under the tooth 18 of the escapement wheel 17 which, under impulsion of the spiral spring 22, turns until it strikes the notch 32 of the lever 33, thus automatically setting the cam shaft 45 by the rotation of the hub 19 and, incidentally the indicating and recording mechanism, in the "hired" position. As the taximeter has been automatically set to the "hired" or recording and registering position when the "flag" and staff is midway or in a predetermined position between the "for hire" and "hired" positions, it is to the driver's advantage to turn the handle 11 until the "flag" and staff is horizontal or in the "hired" position, because, as before mentioned, he is liable to punishment when operating a hired conveyance with his "flag" and staff in an improper position. The driver can gain no advantage by allowing the "flag" and staff to remain in any position but horizontal when it is "hired" as the fare indicator and totalizing mechanism are automatically set in operation at the predetermined point when the flag has moved to a position as indicated in Fig. 3.

It can be seen that the turning of the gear 1 automatically winds the spiral spring 22 which is connected to gear 1 by pin 23, thus keeping the spiral spring 22 always under the proper tension. The hub which is slotted is held stationary and does not revolve when the gear 1 and the cam wheel 2 are rotated by the handle 11 until the escapement wheel 17 is released from its setting by the lever 25 (Fig. 3). Then the hub 19 rotates ⅓ of a revolution and automatically sets the recording totalizers and fare recording mechanism in position for operation and takes the same out of the control of the driver.

A portion of the description so far has dealt principally with the setting of the mechanism from the "for hire" to "hired" position. The two remaining settings from "hired" to "cash" and from "cash" to "for hire" will now be described. The "hired" position lever 33 (Figs. 1, 3 and 4) is rotatably mounted on stud 26 and is held in the position shown under spring tension by a spring 28 which is fastened to a pin 34 secured to the lever 33. A face 35 is formed on the lever 33 and when engaged by the face 31 of the pin 23, it rocks the lever 33 downwardly and allows the tooth 18 of the escapement wheel 17 to free itself from the notch 32 of the lever 33 and rotate from the "hired" to "cash" position. The "cash" position lever 36 (Figs. 1, 3 and 4) is pivoted on a stud 37 affixed to the back plate 6, and has a notch 38 on its lower side and an arm 39 formed on its lower end. An arm 40 is also secured to the lever 36 and has near its end a notch 41 which retains one end of a spring 42, the other end being fastened to a pin 43 on the back plate 6. The spring 42 exerts a tension on the lever 36 and tends to hold it against the periphery of the escapement wheel 17, the tooth 18 of which engages with the notch 38 of the lever 36 when in its path. The arm 39 of the lever 36 has a face 44 which when in engagement with the face 31 of the pin 23 causes the lever 36 to move upwardly, thus disengaging the notch 38 from the tooth 18 and allowing the escapement wheel 17 to rotate from the "cash" to the "for hire" position. The actuation of the lever 36 is so timed that its notch 38 releases the escapement wheel 17 when the "flag" 46 and staff 47 is traveling upward and is in the midway or the predetermined position. The "cash" position is used when a certain amount of waiting time is required (in this taximeter 8 minutes) to make change and discharge the passenger.

With a taximeter utilizing our invention it is impossible for the driver to "notch" the meter in any position as the connection to the registering mechanism is completely out of his control when the lever has passed a certain critical point. Therefore, the meter must be put in one of the indicating positions "hired", "for hire" or "cash."

In the drawings Figs. 7 and 13, 93$^a$ is the fare wheel for indicating the initial charge and all charges less than one dollar. The fare wheels 92 and 93 indicate charges of one dollar or more. The totalizer "A" on the face of register indicates "initial drops", that is, everytime the flag has been dropped and the vehicle hired. The totalizer "B" is a fractional indicator showing subsequent charge after initial charges for fractions of a mile.

The fare wheels 92, 93, 93$^a$ and the totalizers "A" and "B" are out of the control of the driver when the flag has been moved a predetermined position as hereinbefore described with the result that said totalizers are recording at all proper times and the owner of the vehicle is thereby enabled to accurately determine the amount due him from the driver.

Means for holding fare indicating devices or wheels in proper position when the restoring slide is out of engagement.

In Figs. 7 and 13 of the drawings, we have shown resilient spring members 90, 91 which are held in frictional engagement with the fare wheels 92, 93, said members being bent at right angles to the main plate 50. These members tend to hold the wheels 92, 93 in proper position and prevent accidental rotation thereof when the restoring slide 94 is out of engagement. These resilient members 90, 91 are held against the main plate 50 by escutcheon pins 95, 96.

The connecting means between the register and driving shaft.

In Fig. 5 of the drawings, we have illustrated one form of connecting means between the shaft 96ª of the registering mechanism and the flexible driving shaft of the vehicle 97. In this case, the flexible driving shaft 97 is encased in a tubing 98, said tubing and flexible shaft extending into a recess or opening 99 in the base 100 of the casing 101. The flexible shaft 97 has affixed to it by solder or in any suitable manner a male member 102. This male member 102 at its free end 103 enters a tubular opening in the registration shaft 104. The tubular member 98 which encases the flexible shaft has soldered to it at its upper end within the recess 99 a tubular member 105. When the flexible shaft is in the position indicated in Fig. 5 of the drawing, with the sealing member 106 in position and a wire 108 inserted through the perforations 109—109, the registering mechanism is permanently sealed and properly fastened with the driving shaft, so that the same cannot be removed unless the seal is broken.

In Fig. 10 we have shown a modified form of connecting device between the registering mechanism and the driving shaft, in which 110 represents a tubular shaft of the registering mechanism.

The shaft 110 is of tubular construction and contains a square rod 111 one end of which has a head 112. To the upper end of shaft 110 is affixed a shouldered rod 113 to which is secured a worm wheel 114. The lower end of the shaft 110 has a shoulder 115 and is journaled in the bracket 116. The ratchet 117 is affixed to the shaft 110 and teeth 118 on its under side engage with the spring pawls 119 secured to a coupling 120. The coupling 120 is guided by the lower end of the shaft 110 and is held in position shown by a pin 121 secured to the bracket 116. The coupling 120 has a square hole 122 which guides the rod 111 and a shoulder 123 which stops the rod 111 when its head 112 strikes said shoulder. A female coupling 124 has formed therein a square hole 125 which engages with the rod 111. The operation is as follows: When the female coupling 124 rotates it carries with it the rod 111 which in turn rotates the coupling 120. The spring pawls 119 on the coupling 120 engage with the ratchet 117 causing it to revolve and, incidently, the shaft 110 and the worm 114. The female coupling 124 is affixed to the flexible shaft 97 said shaft being encased in the tubing 98 to which is secured the tubular member 105. The female coupling 124 is held in place by the tubular member 105 which in turn is clamped in position by the sealing sleeve 106. The object of this modification is to facilitate the installation of the taximeter on the conveyance or taxicab. As may be seen, the rod 111 when the female coupling 124 is removed, will drop down until the head 112 of said rod strikes the shoulder 123 of the coupling 120. The rod 111 will then protrude beyond the bottom of the case thus leaving it in full view and easily accessible for future installation.

Mechanism for preventing overthrow on the differential shaft when resetting said shaft to earn initial charge.

As embodied in Fig. 6, the main plate 50 has journaled therein the cam shaft 45 to which is affixed the cams 51 and 52. A lever 53 has a slot 54 which is constrained by cam shaft 45 and partially guides lever 53. A pin 55 is secured to the lever 53 and coacts with the cam 51 thus actuating the lever 53 at the proper time. To the other end of the lever 53 is secured a pin 56 which carries one end of a spring 57 the other end of said spring being secured to pin 58 affixed to the main plate 50. The lever 53 is retained in the position shown by the slot 54, the spring 57 and a pin 59 secured to the main plate 50. A pawl 60 is rotatably mounted on a stud 61 affixed to the lever 53 and is retained by a spring 62 against a stop piece 63 fastened to the lever 53. The spring 62 is secured to the lever 53 by a stud 64 and a pin 65. The pawl 60 has a face 66 which engages with the teeth 67 of the ratchet wheel 68 secured to the differential shaft 69 one end of which is journaled in the main plate 50. The ratchet wheel 68 when actuated by the pawl 60 sets the differential shaft 69 in its initial or starting position so that when in turn, the road drive or clock mechanism drive the differential shaft 69 in order to earn the initial charge, the said shaft will always start from a certain predetermined position, and, hence, the cash wheels 93ª, 93 and 92 which are operated therefrom will only be actuated when the differential shaft has turned a proper portion of one revolution thus insuring an equal distance traveled or equal time consumed for each actuation of said cash wheels. It can be seen that the setting of the differential shaft 69 in its initial position and retaining it in that position until it is actuated by the road drive or clock mechanisms, is of utmost importance if an accurate reading is to be had on the cash wheels. Means are provided for insuring this initial position of the differential shaft 69. As embodied, when the lever 53 is actuated by the cam 51 it moves to the left, carrying with it the pawl 60 and the stop piece 63. When the pawl 60 strikes one of the teeth 67 of the ratchet wheel 68, it rotates said ratchet wheel in a clockwise direction and simultaneously, the stop piece 63 moves into the path of another of the teeth 67 thus, as shown in dot and dash in Fig. 6, preventing the ratchet wheel 68 from over-throwing or overshooting. Means to prevent the ratchet wheel 68 from rotating in a counter-clockwise direction when the pawl 60 is withdrawn will be hereinafter described.

*Mechanism for retaining differential shaft in its predetermined or initial position after being reset in said position.*

In the Decker device means were provided for retaining the differential shaft 69 in a predetermined or initial position but due to wear, etc., of portions of the mechanism this position was not always insured. In Fig. 8 the gear 130 and the disk 131 are fixed to the hub 132 which is freely mounted on the differential shaft 69. In a like manner the gear 133 and the disk 134 are fixed to a hub 135 which is also freely mounted on the differential shaft 69. The disks 131 and 134 have mounted thereon the pawls 136 and 137, said pawls being spring-pressed into engagement with the ratchet wheels 138 and 139 fixed on a hub 140, said hub being secured to the differential shaft 69. The gear 133, Fig. 5, is in mesh with the clock gear train 141, 142, 143, 144 and 145 and the gear 130 is in mesh with the road drive gear train 146, 147, 148, 149, 150, 152, 153, 154, 155, 156 and 157. In the Decker device, after the differential shaft 69 has been reset to its predetermined or initial position by the lever 53 (Fig. 6), it was held in that position by the pawls 136 and 137 (Fig. 8) engaging with the ratchet wheels 138 and 139. However, it can be seen that as the pawls 136 and 137 are mounted on the disks 131 and 134 which in turn are connected to the road drive gear train and clock gear train through the gears 130 and 133, any back-lash that might be in said gear trains would be transmitted to the pawls 136 and 137, thus making them liable to a movement consistent with the amount of back-lash. This movement would take place as the pawl 60 (Fig. 6) withdrew from engagement with the ratchet wheel 68 causing the differential shaft 69 to rotate in a counter-clockwise direction until the back-lash was taken up, thereby subjecting the initial or predetermined position of said shaft and, incidentally, the time or distance required to earn the initial charge, to inaccuracies.

In our device, inaccuracies due to retaining the differential shaft 69 in its initial or predetermined position are eliminated. As embodied in Figs. 5, 8 and 9, a multi-tooth ratchet wheel 70 is fixed to one end of the differential shaft 69. The multi-tooth ratchet wheel 70 consists of two disks 71 and 72 affixed to a hub 74 said disks having formed on their periphery a large number of teeth which are staggered as shown to make a more effective engaging range for the retaining pawl 73. The retaining pawl 73 is rotatably mounted on a stud 75 which is fixed in a bracket 76. A spring 77 held on the stud 75 presses the retaining pawl 73 into engagement with the teeth of the ratchet wheel 70. When the differential shaft 69 is being turned to its predetermined or initial position it carries with it the multi-tooth ratchet wheel 70 the teeth of which pass under the retaining pawl 73. However, when the predetermined or initial position is reached the pawl 73 engages with one of the teeth of the multi-tooth ratchet wheel 70 thus preventing the differential shaft 69 from any counter-clockwise rotation whatsoever when the resetting mechanism is withdrawn from the ratchet wheel 68 (Fig. 6). It can thus be seen that at no time will the predetermined or initial position of the differential shaft 69 vary as it is positively prevented from over-throwing by the stop piece 63 (Fig. 6) and positively prevented from a reverse movement by the retaining pawl 73 (Fig. 8), thereby eliminating all inaccuracies in the earning of the initial charge. As the mechanism just described eliminated inaccuracies caused by the back-lash of the gear trains, it has been named therefrom, hence the term "back-lash mechanism."

In accordance with the provisions of the patent statute, we have described the principle of our invention together with the apparatus which we now consider to represent the best embodiment thereof, but we desire it understood that our invention is not confined to the particular form of apparatus herein shown and described, the same being merely illustrative, and that the invention can be carried out in other ways without departing from the spirit of our invention, and, therefore, we claim broadly the right to employ all equivalent instrumentalities coming within the scope of the appended claims, and by means of which the objects of our invention are attained, and the new results accomplished, as herein set forth, as it is obvious that the particular embodiments herein shown and described are only some of many that can be employed to attain these objects and accomplish these results.

Having now described our invention, what we claim and desire to secure by Letters Patent is:

1. In a device of the character described, a fare registering device and a movable indicator, movable operating means for producing movement of the indicator, an escapement, said escapement comprising a moving member for initiating operation of said fare registering device, a detent and independent motive means for said movable member, means for releasing said detent by movement of said operating means, and when released, permitting said moving member to be precipitately moved by said motive means to complete said initiating operation independent of further movement of said operating means.

2. In a device of the character described, a fare registering device and a movable indicator, a handle for producing movement of the indicator, an escapement, said escapement comprising a moving member for initiating operation of said fare registering device, a detent and independent motive means for said movable member, means for releasing said detent by movement of said handle, and when released, permitting said moving member to be precipitately moved by said motive means to complete said initiating operation independent of further movement of said handle.

3. In a device of the character described, a fare registering device and a movable indicator, a cam gear for producing movement of said indicator, manual means for rotating said cam gear, an escapement wheel for controlling the initiation of operation of said registering device, means for rotating said escapement wheel, means for releasably holding said escapement wheel against rotation, and means carried by said cam gear for releasing said holding means whereby said escapement wheel rotating means may rotate said wheel to initiate operation of said registering device independently of the movement of said indicator.

4. In a device of the character described, a fare registering device and a movable indicator, a cam gear for producing movement of said indicator, manual means for rotating said cam gear, an escapement wheel for controlling the initiation of operation of said registering device, a spring for rotating said escapement wheel, means for releasably holding said escapement wheel against rotation, means carried by said cam gear for releasing said holding means to permit said spring to rotate said escapement wheel with said fare registering device whereby operation of the same is initiated independently of the movement of said indicator.

5. In a device of the character described, a fare registering device and a movable indicator, a cam gear for producing movement of said indicator, manual means for rotating said cam gear, an escapement wheel positioned on and concentric with said cam gear, but adapted for rotation independent of the rotation of said cam gear, a coil spring adapted to rotate said escapement wheel, a connection between said cam gear and said spring whereby rotation of said cam gear will wind said spring, a detent for releasably holding said escapement wheel against rotation by said spring, means carried by said cam gear for releasing said detent to permit said spring to rotate said escapement, and means operatively connecting said escapement wheel with said fare registering device whereby operation of the same is initiated independently of the movement of said indicator.

6. In a device of the character described, a fare registering device and a movable indicator, a cam gear for producing movement of said indicator, a mutilated gear meshing with and giving a step by step unidirectional rotation to said cam gear, means for preventing reverse rotation of said cam gear, an escapement wheel positioned upon and concentric with said cam gear, a coil spring also concentric with said cam gear and having one end attached to said cam gear and its other end attached to said escapement wheel, whereby rotation of said cam gear will wind said spring and unwinding of said spring will rotate said escapement wheel, a releasable detent for holding said escapement wheel against rotation under impulse from said spring, a detent releasing member carried by and rotating with said cam gear, an operative connection between said escapement wheel and said fare registering device whereby rotation of said escapement wheel will initiate operation of said fare registering device, manual means for rotating said mutilated gear whereby said cam gear is rotated and said indicator moved at a speed proportional to the speed of rotation of said cam gear, but said escapement wheel is released and moves at an accelerated speed, under impulse from the spring, relative to the speed of rotation of said cam gear producing initiation of the operation of said fare registering device independently of movement of said indicator.

This specification signed this 17th day of September, 1923.

CHARLES A. FAUSEL.
HARRY E. BAUER.